Figure 1:
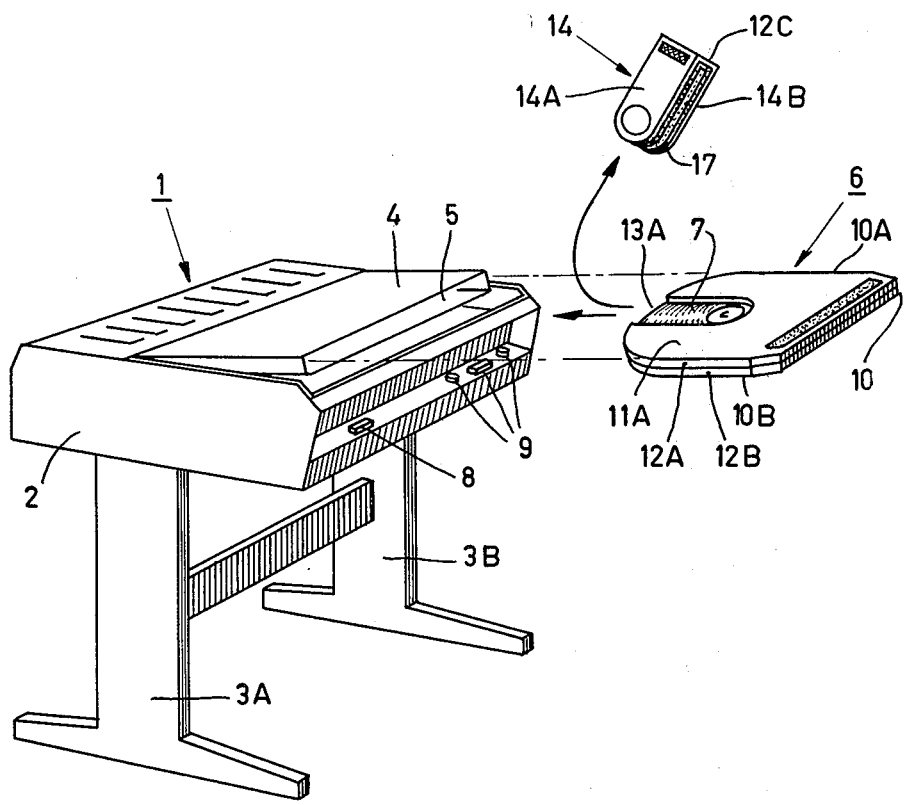

United States Patent [19]

Steenberg

[11] 4,443,874
[45] Apr. 17, 1984

[54] INFORMATION-DISC CASSETTE

[75] Inventor: Johannes Steenberg, Apeldoorn, Netherlands

[73] Assignee: U.S. Philips Corporation, New York, N.Y.

[21] Appl. No.: 350,449

[22] Filed: Feb. 19, 1982

[30] Foreign Application Priority Data

Nov. 11, 1981 [NL] Netherlands .................. 8105096

[51] Int. Cl.³ .................. B65D 85/30; G11B 23/02
[52] U.S. Cl. .................. 369/291; 206/303; 206/312; 206/444; 360/133
[58] Field of Search .................. 369/291; 360/133; 206/444, 309, 312, 303

[56] References Cited

U.S. PATENT DOCUMENTS 4,131,199 12/1978 Hatchett et al. .................. 206/444
4,286,790 9/1981 Siryj et al. .................. 360/133

FOREIGN PATENT DOCUMENTS 2644894 6/1978 Fed. Rep. of Germany ...... 369/291

Primary Examiner—Steven L. Stephan
Attorney, Agent, or Firm—Thomas A. Briody; Robert T. Mayer; Algy Tamoshunas

[57] ABSTRACT

An information-disc cartridge containing a disc within an enclosure, which has two major walls on opposite sides of the disc and a peripheral wall. Each of the two major walls has an opening so as to permit a disc drive to engage the disc. On each side of said disc, information can be recorded and/or reproduced via the openings in the major walls. The openings are closed by a single closing member which simultaneously closes both openings in the major walls. The closing member which is bodily removable in a radial direction and comprises a portion of each of the major walls of the disc enclosure and a portion of the peripheral wall between the two portions of the major walls.

4 Claims, 7 Drawing Figures

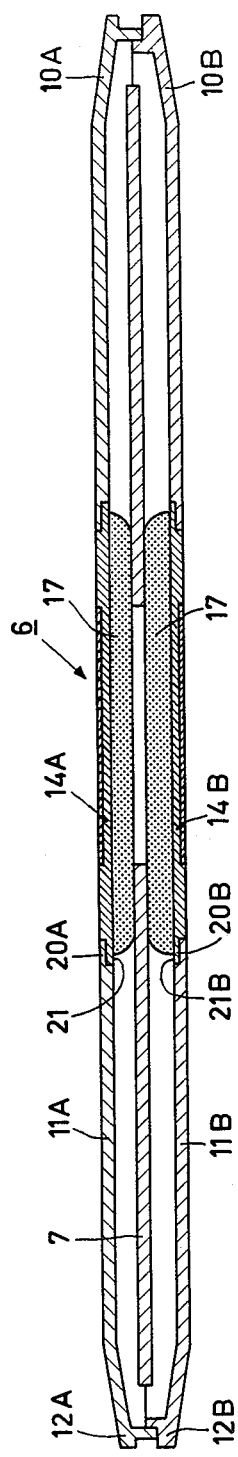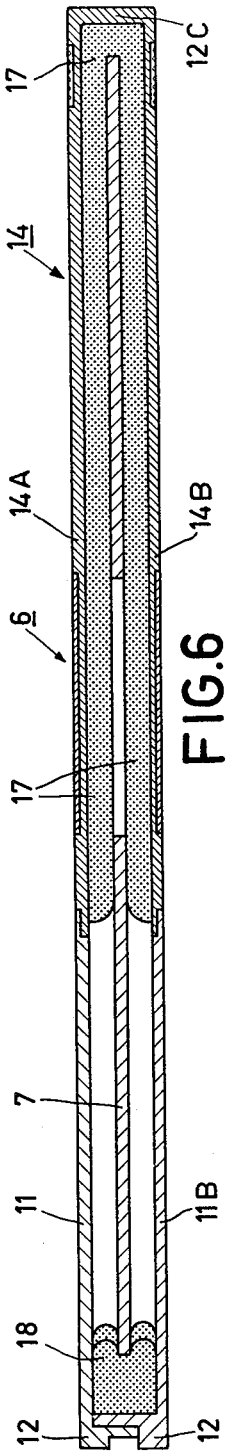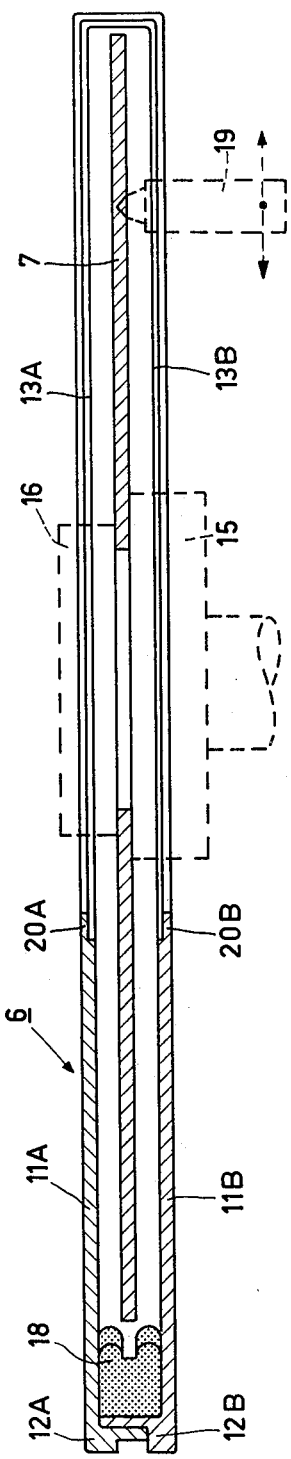

INFORMATION-DISC CASSETTE

The invention relates to an information-disc cassette, or cartridge which comprises a rotatable disc for recording and/or reproducing information and an enclosure comprising major walls on both sides of the disc and a surrounding side wall. Each of the major walls has an opening, which can be closed by means of a closing members, for the passage of means for recording and/or reproducing the information on the disc.

Such an information disc cassette, specifically a magnetic-disc cassette, is known from U.S. Pat. No. 3,529,301. In this and in other similar information-disc cassettes, the disc remains permanently within the enclosure. For the passage of means for recording and/or reproducing the information during use openings are formed in each major wall, which openings permit the passage of said means, such as magnetic heads or an optical pick-up.

Both in the case of optical and magnetic information-discs it is important to provide optimum protection of the disc surface against dust and touching. Therefore, there is provided a closing element for each of the openings in the major walls of the known information-disc cassette, which element takes the form of a closing member which is pivotally mounted in the information-dics cassette. The two closing members can each be opened when the information disc cassette is put into operation by means of portions which project from the enclosure.

The known information-disc cassette has two disadvantages. The closing members each co-operate with a plurality of other parts which actuate the closing members, so that to close each of the openings in the major walls requires a closing mechanism with a plurality of components. A second disadvantage is that for accommodating each closing mechanism, in particular the closing members, a certain mounting height in the information-disc cassette is required. This results in a greater height of the information-disc cassette. It is an object of the invention to provide an information-disc cassette of the type mentioned in the opening paragraph which does not require a closing mechanism for the actuation of the closing members and which consequently has a smaller mounting height. In accordance with the invention this object is achieved by the provision of only one closing member for simultaneously closing the two openings in the major walls. The closing member is radially removable from the enclosure and comprises a portion of each of the major walls and a portion of the peripheral wall disposed between said portions of the major walls.

Before use, the entire closing member of the information-disc cassette in accordance with the invention is removed, for example manually. Immediately after use of the information-disc cassette, the closing member is refitted. Thus, the protection of the information-disc surface is almost as complete as in said known information-disc cassette.

In addition to the afore-mentioned disadvantages, the known information-disc cassette has a further disadvantage. In order to enable the information disc to be rotated inside the enclosure, the major walls are formed with central openings for the passage of drive members of a drive mechanism. Hence, dust and contaminants can reach the information disc through said central openings. An embodiment of the invention which also provides a solution to this problem is characterized in that the closing-member portions disposed in the major walls extend in a radial direction beyond the centre of the disc. When the closing member is in place the openings are fully closed and after the closing member has been removed said openings in the major walls expose the centre of the disc for the passage of drive members of a drive apparatus for rotating the disc. An information-disc cassette in accordance with this embodiment of the invention has a fully closed external shape as long as the information disc is not in use, thus providing optimum protection of the disc during storage and handling.

As long as the information-disc cassette is not in use, the disc should occupy a fixed position in the cassette so as to prevent damage to the disc as a result of relative movements between the disc and the enclosure. Said known information-disc cassette, is provided with clamping members coupled to the closing mechanism and arranged so as to clamp the information disc in position inside the enclosure. In accordance with the present invention this problem can be solved in a simple manner by providing the closing member with elastically compressible supporting means at the sides facing the disc. When the closing member has been fitted, the disc is clamped between the elastically compressible supporting means.

For correct cooperation between the closing members and the other parts of the enclosure, the closing member and the adjacent parts of the two major walls may be provided with guide elements which cooperate with each other and which permit only rectilinear sliding movements relative to each other.

Figures 2, 3:
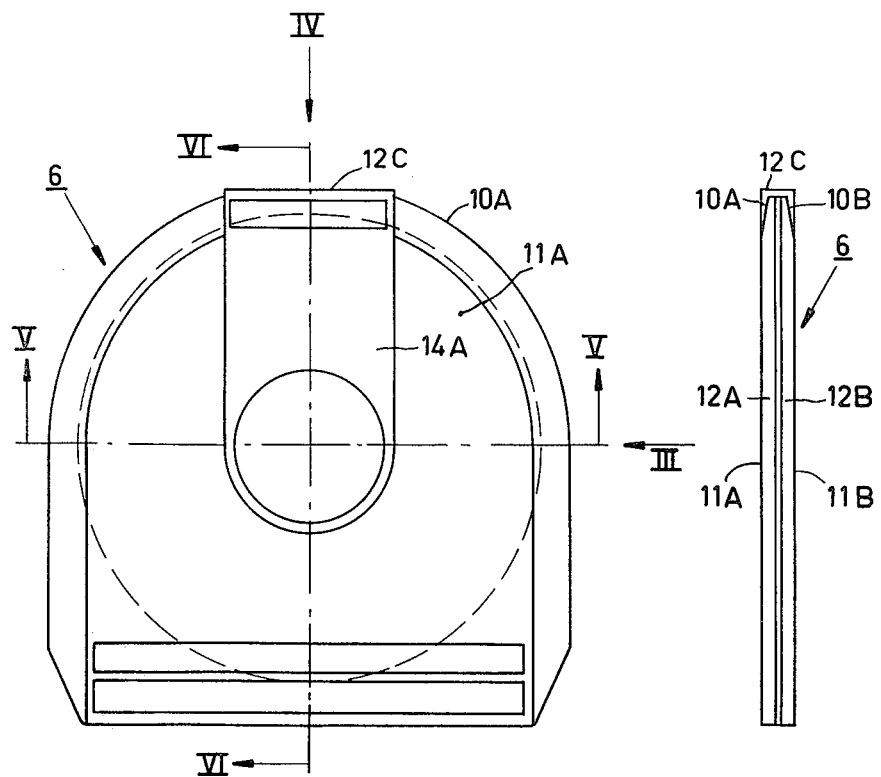
Figure 4:
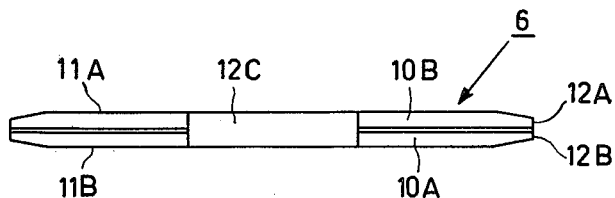

The invention will now be described in more detail with reference to the drawing, in which:

FIG. 1 is a perspective view of an information-disc drive apparatus and an associated information-disc cassette in accordance with the invention, FIG. 2 is a plan view, on a reduced scale, of an information-disc cassette in accordance with the invention, FIG. 3 is a side view in accordance with the arrow III in FIG. 2, FIG. 4 is a view in accordance with the arrow IV in FIG. 2, FIG. 5 is an enlarged sectional view taken on the line V—V in FIG. 2, FIG. 6 is an enlarged sectional view taken on the line VI—VI in FIG. 2, and FIG. 7 again shows the sectional view of FIG. 6 but now with the closing member removed.

The drive apparatus 1 in FIG. 1 comprises a housing 2 on legs 3a and 3b. At the top a cover 4 is pivotally mounted in the housing. In the Figure the cover 4 is shown in a swung-open position, exposing a front opening 5 for receiving an information-disc cassette 6. The housing 2 comprises means for rotating an optical disc 7 of the information-disc cassette, which means are disposed underneath the cover 4 and are not shown in the drawing. Furthermore, the housing accommodates the required electrical and electronic circuitry and at its front a number of controls 8 and 9 are located. After insertion of the information-disc 6 through the front opening in the cover 4, said cover is closed manually and a latching mechanism in the housing 2 locks the cover in the closed position. Unlatching is possible by actuating the push-button 8. The drive apparatus 1 does not form part of the present invention and will not be described in more detail.

The information-disc cassette or cartridge 6 comprises the rotatable optical disc 7 for recording and/or reproducing information. The disc is located in an enclosure 10 comprising two enclosure halves 10a and 10b secured to each other, each half comprising a major wall 11a and 11b respectively and a half peripheral wall 12A and 12B respectively. An opening 13A, which can be closed, is formed in the major wall 11A and opening 13B that can also be closed is formed in the major wall 11B. Said openings can be closed by closing-member portions 14A and 14B respectively and serve for the passage of means 19, belonging to the drive apparatus, for recording and/or reproducing information on the disc 7 (see FIG. 7).

The closing-member portions 14A and 14B form part of a single closing member 14 for the simultaneous closure of the two said openings 13a and 13b in the two major walls. When the member has been fitted, they form part of the two major walls 11A and 11B and they are interconnected by the portion 12C of the peripheral wall which is disposed between said parts of the major walls. The complete closing member can be removed from the enclosure in a radial direction. FIG. 1 shows that the closing member 14 is removed from the enclosure before the information-disc cassette is inserted into the cover 4. When the information-disc cassette 6 is located in the drive apparatus 1 the closing member 14 is kept at hand to be refitted upon removal of the information disc from the drive apparatus 1.

The portions 14A and 14B respectively of the closing member 14 situated in the major walls 11A and 11B extend in the radial direction beyond the centre of the disc 7, in such a way that when the closing member has been fitted the enclosure 10 has a fully closed external shape. When the closing member has been removed the openings 13A and 13B in the major walls expose the centre of the disc for the passage of drive members 15 and 16 (see FIG. 7) of the drive apparatus 1.

At the sides facing the disc 7, the closing member is provided with elastically compressible supporting means in the form of a pad 17 of an expanded plastics or foam rubber. Said pad has a thickness such that the disc 7 is clamped in place by the elastically compressible layer when the closing member is in place. On the inner side of the wall 12C of the closing member 14 there is also arranged a foam rubber or expanded-plastics pad 18 inside the enclosure. When the information-disc cassette is closed the disc 7 inside the enclosure 10 is clamped in place by the pad 17 and the pad 18 in such a way that substantially no relative movements between the disc and the enclosure are possible. Such steps are generally desirable because the discs of information-disc cassettes of the present type must be driven inside the enclosure, so that a certain clearance within the enclosure is necessary. In the absence of suitable immobilizing means the disc, upon removal of the information-disc cassette from the drive apparatus, could move inside the enclosure, which could lead to the disc being damaged. To allow rotation inside the enclosure the disc should have some axial and radial clearance inside the enclosure. The axial clearance is eliminated by the elastic pads 17 attached to the portions 14A and 14B of the closing member 14. The radial clearance is eliminated by cooperation of the part of the pad 17 located near the wall 12C which resiliently urged the disc in a radial direction against the elastic pad 18.

FIG. 7 represents the situation during operation. The disc has been moved slightly to the right in a radial direction, so that it is no longer in contact with the pad 18. This Figure also shows the position of an optical pick-up 19 which cooperates with the disc 7 via the opening 13B in the major wall 11B.

For a satisfactory co-operation of the closing member 14 with the enclosure 10, the closing member and the adjacent parts of the two major walls 11A and 11B are provided with cooperating guide elements in the form of ridges 20a and 20b and 21 respectively, which only permit radial sliding movements relative to each other.

Within the scope of the invention embodiments other than those shown are possible. The closing member, instead of being provided with the padding 17, may for example carry other elastically compressible supporting means, such as plastic leaf springs. In the case of discs provided with a hub, such as most magnetic discs, there is no risk of contact between the disc surface and the enclosure. In the case of a disc cassette containing a magnetic disc it is also advisable not to provide the closing member with supporting means which contact the disc surface.

What is claimed is:

1. An information disc cartridge comprising a rotatble disc for storing information which is recorded thereon and/or reproduced therefrom by an information recording and/or reproducing apparatus and a disc enclosure having two major walls each on one side of said disc and a surrounding peripheral wall, each of said major walls having an elongated opening extending radially beyond the center of said disc so as to permit access to said disc by the apparatus for recording and-/or reproducing information and to expose the central portion of said disc for engagement thereof by a disc drive member for rotating the disc, said cartridge further comprising a single, radially removable closing member for closing said openings in said major walls, said closing member having a first and second portion each configured to close a respective one of said openings and a peripheral portion disposed between and secured to said first and second portions so that when said closing member is fitted onto said enclosure, said first and second portions simultaneously close said openings in said two major walls, said closing member further having elastically compressible supporting means arranged on the sides of said closing member facing said disc so as to clamp the disc when the closing member has been fitted onto said enclosure.

2. An information-disc cartridge as claimed in claim 1, characterized in that the closing member and the adjacent parts of the two major walls are provided with guide elements which cooperate with each other and which only permit rectilinear sliding movements relative to each other.

3. An information disc cartridge comprising a rotatable disc for storing information which is recorded thereon and/or reproduced therefrom by an information recording and/or reproducing apparatus and a disc enclosure having two major walls each disposed on one side of said disc and a surrounding peripheral wall, each of said major walls having an elongated opening extending radially with respect to said disc so as to expose a surface portion of said disc to thereby enable information to be recorded thereon and/or reproduced therefrom, said cartridge further comprising a closing member for closing said openings in said major walls, said closing member having a first and second wall portion each configured to fit into and close a respective one of said openings in said major walls and a peripheral portion connected to said first and second portions so as to form an integral unit having a generally U-shaped cross section such that when said closing member is fitted onto said enclosure, said disc passes between said first and second portions which fit into and simultaneously close said openings.

4. The cartridge as claimed in claim 3 wherein at least one of said first and second wall portions and an adjacent major wall is provided with guide elements which cooperate with each other so as to permit only rectilinear sliding movement of said closing member relative to said enclosure.

* * * * *